Patented Feb. 25, 1936

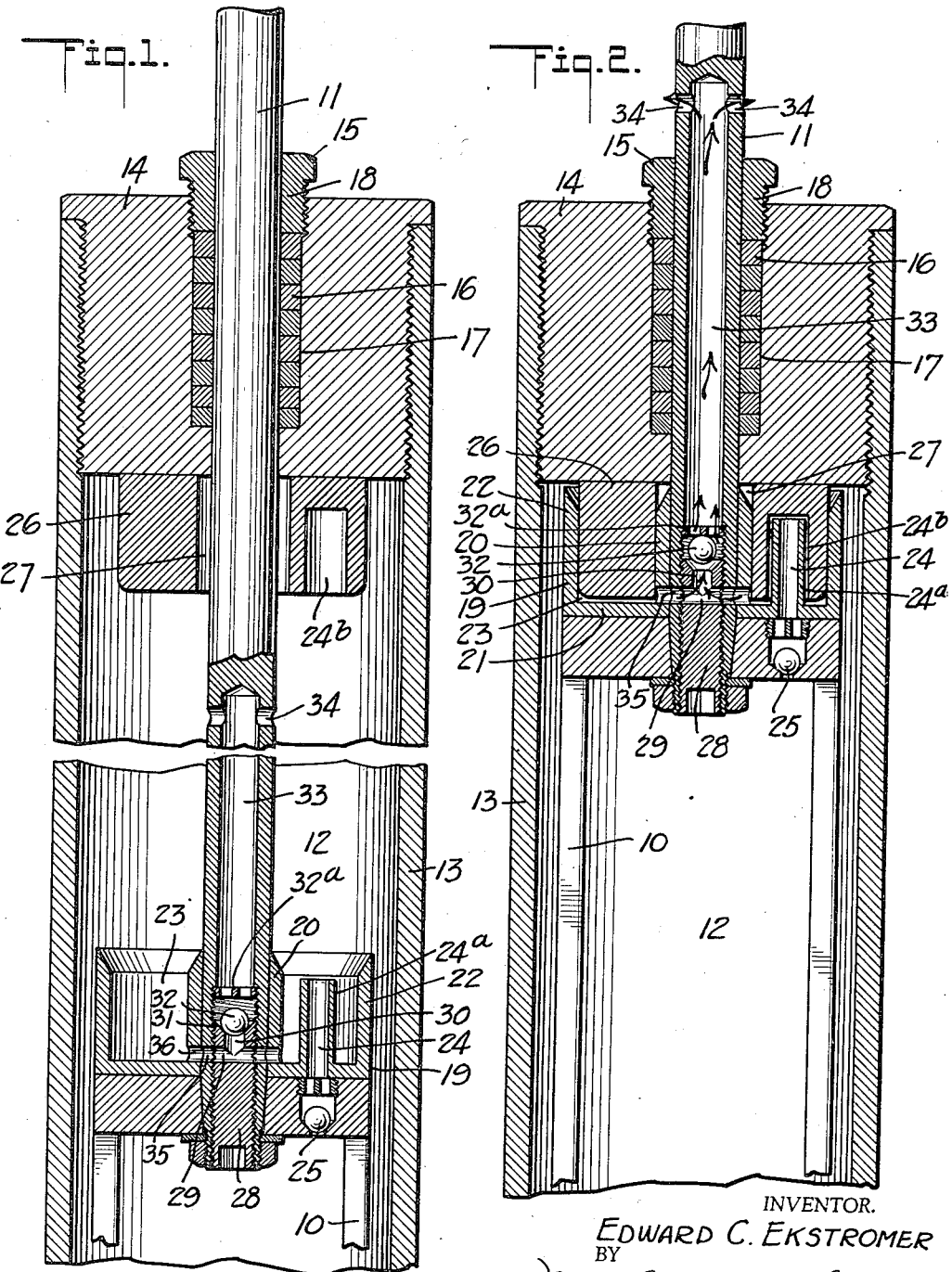

2,031,826

UNITED STATES PATENT OFFICE 2,031,826

PROTECTING MEANS FOR MECHANISMS

Edward C. Ekstromer, Los Gatos, Calif., assignor of one-half to Homer J. Lloyd, Los Gatos, Calif.

Application September 22, 1934, Serial No. 745,161

11 Claims. (Cl. 286—27)

This invention relates generally to means for protecting mechanisms by removing liquids from locations wherein the liquids, if uncontrolled, would subsequently come into contact with the mechanisms and either damage or destroy the latter.

In instances wherein a mechanism casing is exteriorly exposed to or submerged in a body of liquid, and encloses mechanism including a member operating through a wall of the casing, it has heretofore been impossible to entirely prevent leakage of liquid between the member and wall of the casing into the latter, nothwithstanding the provision of packing glands which at best serve to minimize the leakage and to leave the mechanism without adequate protection against the harmful effects of the liquid coming in contact therewith.

It is the purpose of this invention to provide a means which, in its association with an enclosed mechanism to be protected against the effects of a harmful liquid from an exterior source, positively insures that any liquid which leaks into the enclosure between the wall of the latter and a member operating through a wall of the enclosure will be collected and ejected from the enclosure before the liquid can reach the mechanism.

In the accompanying drawing,

Figure 1 is a vertical sectional view illustrating the means embodying this invention, in association with an enclosure for a mechanism to be protected against liquid from an exterior source;

Figure 2 is a view similar to Figure 1, and illustrating another position occupied by the means embodying this invention.

Referring specifically to the drawing, this invention, in its present embodiment, is shown for the purpose of illustration associated with a mechanism which includes a crosshead 10 adapted to be reciprocated during operation of the mechanism to impart a corresponding movement to a member 11 in the form of a rod which is secured at one end to the crosshead and operates through a wall of a closed chamber 12 defined by a casing 13 enclosing the mechanism.

The wall of the chamber through which the member 11 extends exteriorly of the chamber for connection to a part (not shown) to be actuated by the member, is defined by a plug 14 threadedly secured in the casing to close the chamber. A packing gland 15 is associated with the member 11 and includes packing 16 seating in a recess 17 in the plug 14, and a nut 18 threaded into the plug to compress the packing.

Assuming that the casing is disposed in a vertical position in a water or oil well, for example, so that the casing is submerged in the liquid with the member 11 projecting upwardly from the casing into the liquid, a leakage of liquid between the member and the wall of the chamber into the latter will occur during reciprocation of the member, nothwithstanding the provision of the packing gland 15.

In order to positively protect the enclosed mechanism against liquid leaking into the chamber 12 as aforestated, a means is provided for collecting and ejecting the liquid from the casing before the liquid reaches the mechanism below the crosshead 10. In this present instance, this means comprises a receptacle in the form of a circular cup 19 secured in any suitable manner to the upper end of the crosshead 10 and having an axially disposed tubular projection 20 in which the lower end of the member 11 has a force fit for co-action of the projection with the bottom and outer walls 21 and 22 of the cup in defining an annular well 23 about the member 11.

The bottom wall 21 of the cup is provided with a port 24 which is controlled by a ball check valve 25 normally closing by gravity and adapted to open in a manner and for a purpose to be later described. It will be clear that liquid leaking past the packing gland 15 will, by capillary action, flow down the surface of the member 11 into the cup 19, and in order to eject from the casing the liquid accumulating in the cup, a piston 26 is fixed to the plug 14 and is of a diameter to snugly fit into the cup, the piston having an axial bore 27 of a diameter to snugly receive the tubular projection 20.

The port 24 is formed in a tubular extension 24a which rises vertically from the bottom wall 21 of the cup 19, and when the working parts are in the positions shown in Figure 2, said extension is adapted to enter the cavity 24b in said piston 26.

The lower end of the member 11 is provided with a removable plug 28 and same is formed with a transverse port 29 and an axial port 30, the latter terminating in a valve seat 31 with which a ball check valve 32 co-acts, above which said valve is an apertured ball stop 32a. The member 11 is provided with an axial bore 33, radial ports 34 at the upper end of the said bore, and radial ports 35 at the lower end of the bore. The ports 35 co-incide with like ports 36 in the aforementioned projection 20.

The operation of the form of the invention shown in Figures 1 and 2 is as follows:

Assuming that in practice the casing 13 is submerged in a body of liquid to dispose the member 11 vertically, and that the member is being reciprocated, it follows that as the member approaches the end of its upstroke, the piston 26 enters the cup 19 and thus exerts pressure upon any liquid which in leaking past the gland 15 has drained from the member into the cup. This causes the ball valve 32 to open and the liquid in said cup will be forced through the ports 36, 35, 29 and 30 into the bore 33, where it will then discharge from the ports 34 and thus be ejected laterally from the casing. As the following downstroke is initiated, the suction created between the cup and piston causes the check valve 25 to momentarily open so as to admit air to the interior of the cup and thus permit the cup to readily separate from the piston. The tubular extension 24a functions to retain in the cup any portion of the liquid which remains in the cup. I wish to particularly call attention to the relation of the ports 34 to the cup, the same being such that the action of the mechanism will cause the liquid to be ejected in operative synchronism with the creation of pressure on the liquid in said cup. In this manner, liquid collected in the cup will be automatically ejected from the casing to insure that the liquid will be positively prevented from reaching the mechanism enclosed by the casing, thereby adequately protecting the mechanism against damage from liquid leaking into the casing in the manner aforestated.

What is claimed is:

1. In combination, means defining a chamber having a mechanism therein to be protected against liquid from an exterior source; said mechanism including a vertically disposed member operating through a wall of the chamber; a receptacle carried by the member in which liquid leaking between the member and said wall into the chamber will be collected; and means co-acting with the receptacle to eject the collected liquid from the chamber and through the said member during one movement of the member.

2. In combination, means defining a chamber having a mechanism therein to be protected against liquid from an exterior source; said mechanism including a vertically disposed member operating through a wall of the chamber; a cup carried by the member in surrounding relation thereto, in which liquid leaking between the member and said wall will be collected; means for displacing liquid in the cup during one movement of the member; and means for conducting the displaced liquid through said member for discharge thereof exteriorly of the chamber.

3. In combination, means defining a chamber having a mechanism therein to be protected against liquid from an exterior source; said mechanism including a vertically disposed reciprocable member operating through a wall of the chamber; a cup carried by the member into which liquid leaking between the member and said wall into the chamber is conducted by the member; and means for ejecting liquid from the cup and through the reciprocal member to a point exteriorly of the chamber during one stroke of the member.

4. In combination, means defining a chamber having a mechanism therein to be protected against liquid from an exterior source; said mechanism including a vertically disposed reciprocable member operating through a wall of the chamber; a cup carried by the member into which liquid leaking between the member and said wall into the chamber is conducted by the member; a stationary piston in the path of upward movement of the cup by the member, adapted to enter the cup and eject liquid therefrom; and means for conducting the ejected liquid exteriorly of the chamber by way of said member.

5. In combination, means defining a chamber having a mechanism therein to be protected against liquid from an exterior source; said mechanism including a vertically disposed reciprocable member operating through a wall of the chamber and provided with a discharge bore; a cup carried by the member into which liquid leaking between the member and said wall into the chamber is conducted by the member exteriorly thereof; a stationary piston in the path of upward movement of the cup by the member, adapted to enter the cup and co-operable with the bore to eject liquid therefrom; and a check valve in said bore.

6. In combination, means defining a chamber having a mechanism therein to be protected against liquid from an exterior source; said mechanism including a vertically disposed, ported, hollow, reciprocable member operating through a wall of the chamber and provided with an upwardly opening check valve; a cup carried by the member into which liquid leaking between the member and said wall into the chamber is conducted by the member exteriorly of the latter; a stationary piston in the path of upward movement of the cup by the member, adapted to enter the cup and eject liquid therefrom and into the member; the cup having a port and a check valve controlling the port so as to open upon downward movement of the member, whereby to admit air to the cup to break any vacuum existing between the cup and piston.

7. The combination, with a casing closed at its upper end and provided with a stationary piston, of a hollow, ported, reciprocal member working in the casing and through the closed end thereof, and a fluid collecting and ejecting mechanism carried by the member and co-operable with the piston to compel ejection of liquid from the mechanism and from the casing by way of the member during actuation thereof.

8. The combination, with a casing having a liquid collecting mechanism therein, of a reciprocally mounted ported member carrying said mechanism and co-operable therewith for conducting liquid from the casing by way of the port of the member.

9. In combination, means defining a chamber having a mechanism therein to be protected against liquid from an exterior source; said mechanism including a vertically disposed member operating through a wall of the chamber; a receptacle carried by the member in which liquid leaking between the member and said wall into the chamber will be collected; and means co-acting with the receptacle to eject the collected liquid from the chamber during one movement of the member.

10. In combination, means defining a chamber having a mechanism therein to be protected against liquid from an exterior source; said mechanism including a vertically disposed member operating through a wall of the chamber; a cup carried by the member in surrounding relation thereto, in which liquid leaking between the member and said wall will be collected; means for displacing liquid in the cup during one movement of the member; and means for conducting the displaced liquid exteriorly of the chamber.

11. In combination, means defining a chamber having a mechanism therein to be protected against liquid from an exterior source; said mechanism including a vertically disposed reciprocable member operating through a wall of the chamber; a cup carried by the member into which liquid leaking between the member and said wall into the chamber is conducted by the member; and means for ejecting liquid from the cup to a point exteriorly of the chamber during one stroke of the member.

EDWARD C. EKSTROMER.